United States Patent
Piponi et al.

(10) Patent No.: US 9,651,382 B1
(45) Date of Patent: May 16, 2017

(54) METHODS AND SYSTEMS FOR DETERMINING ALTITUDES FOR A VEHICLE TO TRAVEL

(71) Applicant: X Development LLC, Mountain View, CA (US)

(72) Inventors: Dan P. Piponi, Oakland, CA (US); Bradley Rhodes, Alameda, CA (US)

(73) Assignee: Google Inc., Mountain View, CA (US)

( * ) Notice: Subject to any disclaimer, the term of this patent is extended or adjusted under 35 U.S.C. 154(b) by 151 days.

(21) Appl. No.: 14/486,829

(22) Filed: Sep. 15, 2014

Related U.S. Application Data

(63) Continuation of application No. 13/729,781, filed on Dec. 28, 2012, now Pat. No. 8,862,403.

(51) Int. Cl.
  *G01C 21/20* (2006.01)
(52) U.S. Cl.
  CPC .................. *G01C 21/20* (2013.01)
(58) Field of Classification Search
  CPC ...... G01C 21/00; G01C 21/005; G01C 21/20; G06F 9/00; G06F 19/00
  USPC ....... 701/533, 410, 411, 415, 422, 423, 522, 701/527
  See application file for complete search history.

(56) References Cited

U.S. PATENT DOCUMENTS

| | | | |
|---|---|---|---|
| 6,167,263 A | 12/2000 | Campbell | |
| 6,324,398 B1 | 11/2001 | Lanzerotti et al. | |
| 6,402,090 B1 | 6/2002 | Aaron | |
| 6,437,743 B1 | 8/2002 | Mintz et al. | |
| 6,507,739 B1 | 1/2003 | Gross et al. | |
| 6,611,755 B1 | 8/2003 | Coffee et al. | |
| 6,628,941 B2 | 9/2003 | Knoblach et al. | |
| 6,678,520 B1 | 1/2004 | Wang | |
| 7,046,934 B2 | 5/2006 | Badesha et al. | |
| 7,356,390 B2 | 4/2008 | Knoblach et al. | |
| 7,469,857 B2 | 12/2008 | Voss | |
| 7,512,462 B2 | 3/2009 | Nichols et al. | |
| 7,844,218 B2 | 11/2010 | Seligsohn et al. | |

(Continued)

FOREIGN PATENT DOCUMENTS

FR 2972697 9/2012

OTHER PUBLICATIONS

"Fleet management with automatic vehicle location", by Harden, M.D., published May 20-22, 1986 (Motorola Inc., Mobile Products Division).

(Continued)

*Primary Examiner* — Brian P Sweeney
(74) *Attorney, Agent, or Firm* — McDonnell Boehnen Hulbert & Berghoff LLP

(57) ABSTRACT

Methods and systems for determining altitudes for a vehicle to travel are provided. In one example, a method comprises receiving information indicating a desired location for a balloon and a time period for traveling to the desired location. A region may include the desired location, and the region can be divided into a plurality of cells. The method may include determining estimated cell locations that can be reached by the balloon over a time interval by following a wind at a given altitude. The method may also include assigning a cost value to each cell based on a proximity of the estimated cell locations to a cell including the desired location. The method may further include determining for each cell an altitude for the balloon to travel based on the assigned cost value, and storing information indicating the cost value and the altitude for the balloon to travel.

27 Claims, 5 Drawing Sheets

(56) References Cited

U.S. PATENT DOCUMENTS

| | | |
|---|---|---|
| 7,946,533 B2 | 5/2011 | Goodzeit |
| 8,116,763 B1 | 2/2012 | Olsen |
| 8,238,903 B2 | 8/2012 | Korb |
| 8,260,485 B1 | 9/2012 | Meuth et al. |
| 8,275,499 B2 | 9/2012 | Coulmeau et al. |
| 2002/0077944 A1 | 6/2002 | Bly et al. |
| 2003/0040273 A1 | 2/2003 | Seligsohn et al. |
| 2006/0063529 A1 | 3/2006 | Seligsohn et al. |
| 2006/0167599 A1 | 7/2006 | Bodin et al. |
| 2007/0288132 A1 | 12/2007 | Lam |
| 2008/0144884 A1 | 6/2008 | Habibi |
| 2009/0267740 A1 | 10/2009 | Pizzuto |
| 2011/0147513 A1 | 6/2011 | Surmont |
| 2012/0073682 A1 | 3/2012 | Geneste |
| 2012/0215505 A1 | 8/2012 | Srivastav |
| 2012/0256770 A1 | 10/2012 | Mitchell |

OTHER PUBLICATIONS

"A Mobile Location—Based Vehicle Fleet Management Service Application", by Silva, A.P., published Jun. 9-11, 2003, IEEE.

A method for Balloon Trajectory Control, by Aaron, K.M. et al., Global Aerospace Corporation, published Jun. 21, 2008.

Path Planning for Autonomous Underwater Vehicles in Realistic Oceanic Current Fields: Application to Gliders in the Western Mediterranean Sea, by Garau B. et al., Journal of Maritime Research, vol. VI. No. II, pp. 5-22, 2009.

Real-time Trajectory Design for Unmanned Aerial Vehicles using Receding Horizon Control, by Yoshiaki Kuwata, Thesis submitted to the MIT Department of Aeronautics and Astronautics, Jun. 2003.

Swarm Intelligence in autonomous collective robotics: from tools to the analysis and synthesis of distributed control strategies, Alcherio Martinoli, Thesis, 1999.

Autonomous Underwater Vehicle Path Planning: A Comparison of A* and Fast Marching Method, Kevin DeMarco, available at http://www.kevindemarco.com/wp-content/uploads/2011/05/fmm__paper__revised.pdf, 2011.

Optimal AUV path planning for extended missions in complex, fast-flowing estuarine environments, Dov Kruger et al., 2007 IEEE Conference on Robotics and Automation, Apr. 2007.

TIME: T = N

TIME: T = N-1

METHODS AND SYSTEMS FOR DETERMINING ALTITUDES FOR A VEHICLE TO TRAVEL

CROSS-REFERENCE TO RELATED APPLICATION

The present application is a continuation of and claims priority to U.S. patent application Ser. No. 13/729,781, filed on Dec. 28, 2012, the entire contents of which are incorporated by reference herein.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In one example, a method is provided that comprises receiving information indicative of a desired location within a region for a vehicle to reside and a time period for traveling to the desired location. The region may be divided into a plurality of cells. The method also comprises determining, by a processor, estimated cell locations that can be reached by the vehicle over a time interval of the time period by following a wind at a given altitude. The method further comprises for the time interval, the processor assigning a cost value to the one or more cells of the plurality of cells based on a proximity of the estimated cell locations to a cell including the desired location and based on a given cost value of the cell for a subsequent time interval. The method further comprises for the time interval, the processor determining for the one or more cells an altitude for the vehicle to travel based on the assigned cost value for the cell, and storing for the time interval information per cell indicative of the cost value and the altitude for the vehicle to travel.

In another example, a computer readable storage medium having stored therein instructions, that when executed by a computing device, cause the computing device to perform functions is provided. The functions comprise receiving information indicative of a desired location within a region for a vehicle to reside and a time period for traveling to the desired location. The region may be divided into a plurality of cells. The functions also comprise determining estimated cell locations that can be reached by the vehicle over a time interval of the time period by following a wind at a given altitude, and for the time interval, assigning a cost value to one or more cells of the plurality of cells based on a proximity of the estimated cell locations to a cell including the desired location and based on a given cost value of the cell for a subsequent time interval. The functions further comprise for the time interval, determining for the one or more cells an altitude for the vehicle to travel based on the assigned cost value for the cell, and storing for the time interval information per cell indicative of the cost value and the altitude for the vehicle to travel.

In still another example, a system is provided that comprises at least one processor, and data storage comprising program instructions executable by the at least one processor to cause the at least one processor to perform functions. The functions comprise receiving information indicative of a desired location within a region for a vehicle to reside and a time period for traveling to the desired location. The region may be divided into a plurality of cells. The functions also comprise determining estimated cell locations that can be reached by the vehicle over a time interval of the time period by following a wind at a given altitude, and for the time interval, assigning a cost value to one or more cells of the plurality of cells based on a proximity of the estimated cell locations to a cell including the desired location and based on a given cost value of the cell for a subsequent time interval. The functions also comprise for the time interval, determining for the one or more cells an altitude for the vehicle to travel based on the assigned cost value for the cell, and storing for the time interval information per cell indicative of the cost value and the altitude for the vehicle to travel.

These as well as other aspects, advantages, and alternatives, will become apparent to those of ordinary skill in the art by reading the following detailed description, with reference where appropriate to the accompanying figures.

DETAILED DESCRIPTION

Figure 1:
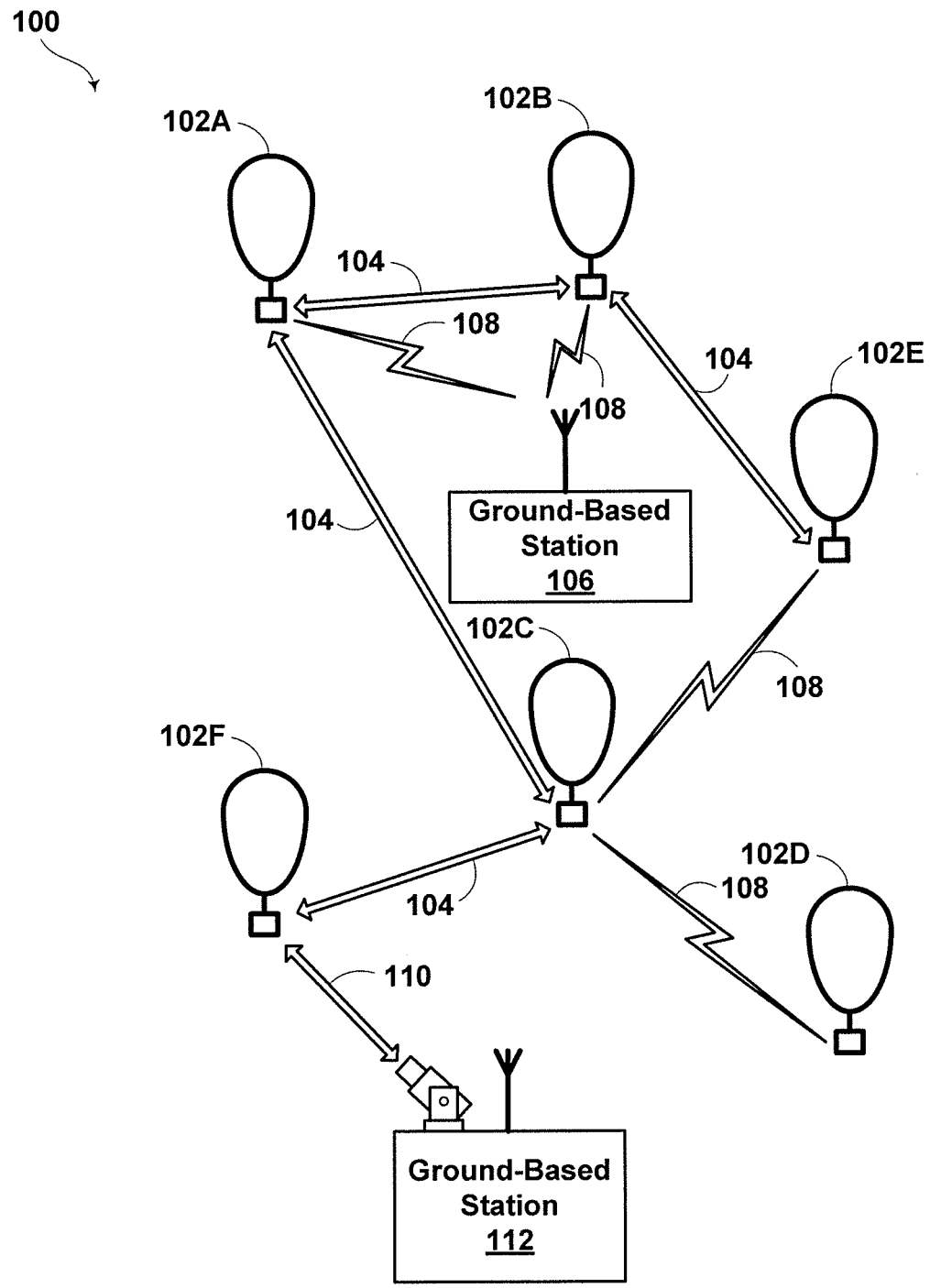
FIG. 1 is a block diagram illustrating an example balloon network.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Examples herein may be configured to provide a data network that includes a plurality of aerial vehicles, such as balloons, for example, within a mesh network formed by high-altitude balloons deployed in the stratosphere. Since winds in the stratosphere may affect locations of the balloons in a differential manner, each balloon in an example network may be configured to change its horizontal position by adjusting its vertical position (i.e., altitude). For example, by adjusting its altitude, a balloon may be able find winds that will carry the balloon horizontally (e.g., latitudinally and/or longitudinally) to a desired horizontal location.

Within examples, aerial vehicles are described as balloons that may include or carry cargo/payload. However, other types of vehicles, elements, objects, etc. may be used, or methods described herein may be applied to functions of other types of vehicles. In addition, some aerial vehicles may be used that include propulsion mechanisms, such as propellers, to further aid in travel or movement, for example.

Within examples, methods and systems are provided for determining an altitude for a balloon to travel. Information about a desired location for a balloon to reside and a time period for traveling to the desired location can be determined. A general region may include the desired location, and the region can be divided into a number of cells so as to divide the region into a grid. Estimated cell locations that can be reached by the balloon over a time interval of the time period by following a wind at an altitude can be determined based on estimated or predicted wind directions and wind speeds. For the time interval, a cost value can be assigned to each cell based on a proximity of the estimated cell locations to a cell including the desired location. In addition, for the time interval, an altitude for the balloon to travel can be determined based on the assigned cost value for the cell. In one instance, the altitude resulting in the lowest cost value can be selected. A map for each time interval can be generated that stores information per cell indicating the cost value and the altitude for the balloon to travel while within the cell.

The cost values may be based on or determined from a cost function as a measure of whether or not a balloon may arrive at a desired location, how closely the balloon can reach that location, how long the balloon may take to reach a location, how much fuel is required to reach a location, or many other factors all of which can be considered in any combination in various ways.

FIG. 1 is a block diagram illustrating an example balloon network 100. As shown, the balloon network 100 includes balloons 102A to 102F, which are configured to communicate with one another via free-space optical links 104. Configured as such, balloons 102A to 102F may collectively function as a mesh network for packet-data communications. Further, at least some of balloons 102A and 102B may be configured for RF communications with ground-based stations 106 via respective RF links 108. Yet further, some balloons, such as balloon 102F, may be configured to communicate via optical link 110 with ground-based station 112.

In an exemplary embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an exemplary embodiment, high-altitude balloons may be generally configured to operate in an altitude range within the stratosphere that has relatively low wind-speeds (e.g., between 5 and 20 miles per hour (mph)).

More specifically, in a high-altitude-balloon network, balloons 102A to 102F may generally be configured to operate at altitudes between 18 km and 25 km (although other altitudes are possible). At such altitudes, for example, the layer of the stratosphere generally has relatively low wind speeds (e.g., winds between 5 and 20 mph) and relatively little turbulence. Further, while the winds between 18 km and 25 km may vary with latitude and by season, the variations can be modeled in a reasonably accurate manner. Additionally, altitudes above 18 km are typically above the maximum flight level designated for commercial air traffic. Therefore, interference with commercial flights is not a concern when balloons are deployed between 18 km and 25 km.

To transmit data to another balloon, a given balloon 102A to 102F may be configured to transmit an optical signal via an optical link 104. In an exemplary embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers.

In a further aspect, balloons 102A to 102F may utilize one or more of various different RF air-interface protocols for communication with ground-based stations 106 via respective RF links 108. For instance, some or all of balloons 102A to 102F may be configured to communicate with ground-based station 106 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect in balloon network 100, balloon 102F is configured as a downlink balloon to provide a high-capacity air-ground link. Like other balloons in an exemplary network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and ground-based station 112.

Note that in some implementations, a downlink balloon 102F may additionally be operable for RF communication with ground-based station 106. In other cases, a downlink balloon 102F may only use an optical link for balloon-to-ground communications. Further, while the arrangement shown in FIG. 1 includes just one downlink balloon 102F, an exemplary balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104.

Ground-based stations, such as ground-based station 106 and/or 112, may include components such as transceivers, transmitters, and/or receivers for communication via RF links and/or optical links with a balloon network. Further, a ground-based station may use various air-interface protocols in order to communicate with a balloon 102A to 102F over an RF link. As such, a ground-based station 106 may be configured as an access point via which various devices can connect to balloon network 100.

In a further aspect, some or all balloons 102A to 102F could be configured to establish a communication link with space-based satellites in addition to, or as an alternative to, a ground-based communication link. In some embodiments, a balloon may communicate with a satellite via an optical link.

Further, some ground-based stations, such as ground-based station 106, may be configured as gateways between balloon network 100 and one or more other networks. Such a ground-based station 106 may thus serve as an interface between the balloon network and the Internet, a cellular service provider's network, and/or other types of networks.

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to the balloon and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an exemplary balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. For instance, the balloons may include components for physical switching that is entirely optical, without any electrical components involved in the physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible.

In a further aspect, balloons in an exemplary balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, the same wavelength can be assigned for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath.

Further, various routing algorithms may be employed in an opaque configuration. For example, to determine a primary lightpath and/or one or more diverse backup lightpaths for a given connection, exemplary balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular quality of service (QoS) may be employed when determining a lightpath. Other techniques are also possible.

In some examples, a balloon network 100 may have a non-uniform topology. For instance, exemplary embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

Figure 2:
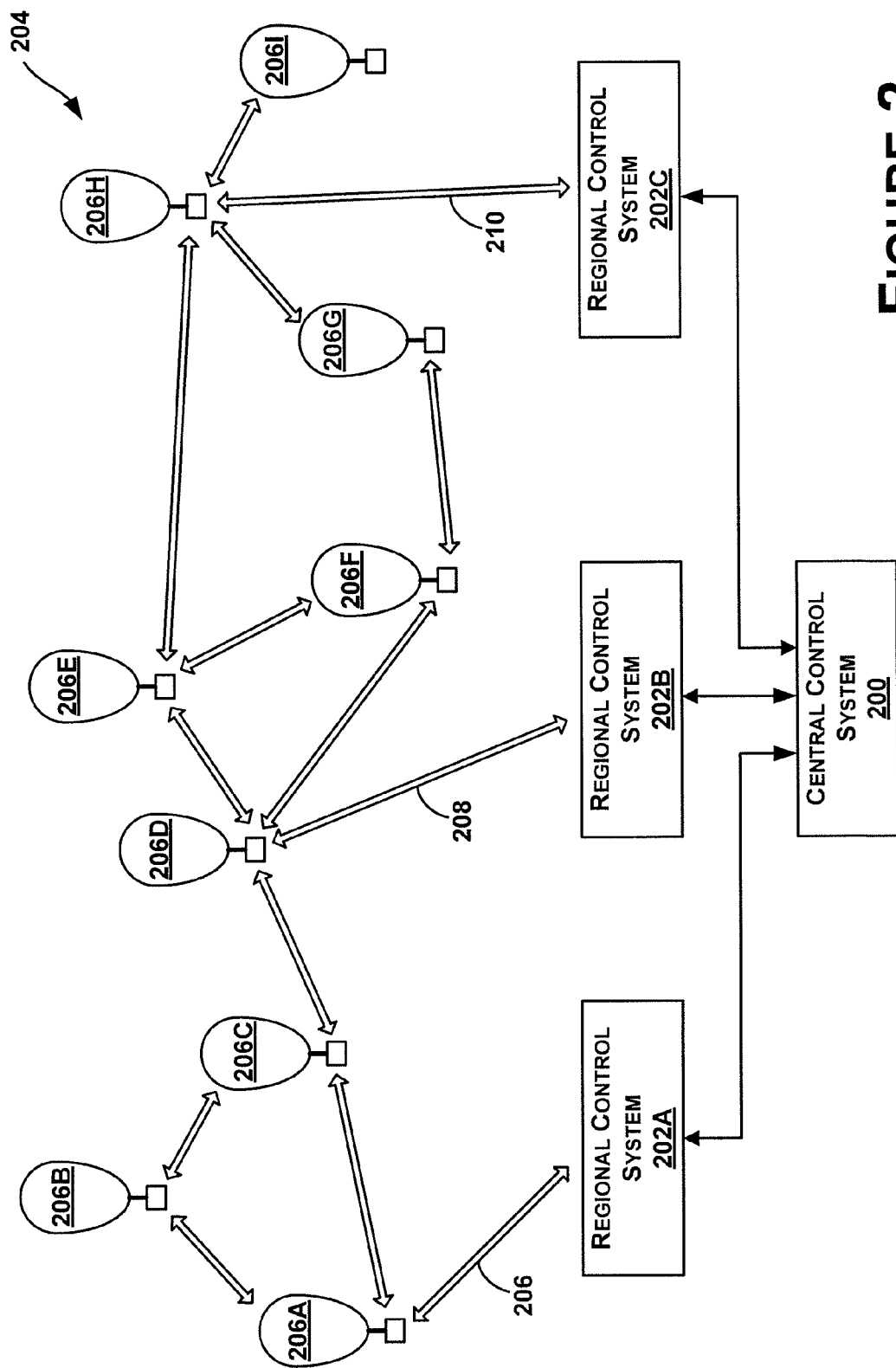
FIG. 2 is a block diagram illustrating an example balloon-network control system.

FIG. 2 is a block diagram illustrating an example balloon-network control system. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C. These regional control systems 202A to 202C may be configured to receive communications and/or aggregate data from balloons in the respective geographic areas that the balloons cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206D, and 206H are configured as downlink balloons. As such, regional control systems 202A to 202C may respectively communicate with balloons 206A, 206D, and 206H via optical links 206, 208, and 210, respectively.

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all of the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

In some embodiments, control and coordination of a balloon network may be shared by a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Figure 3:
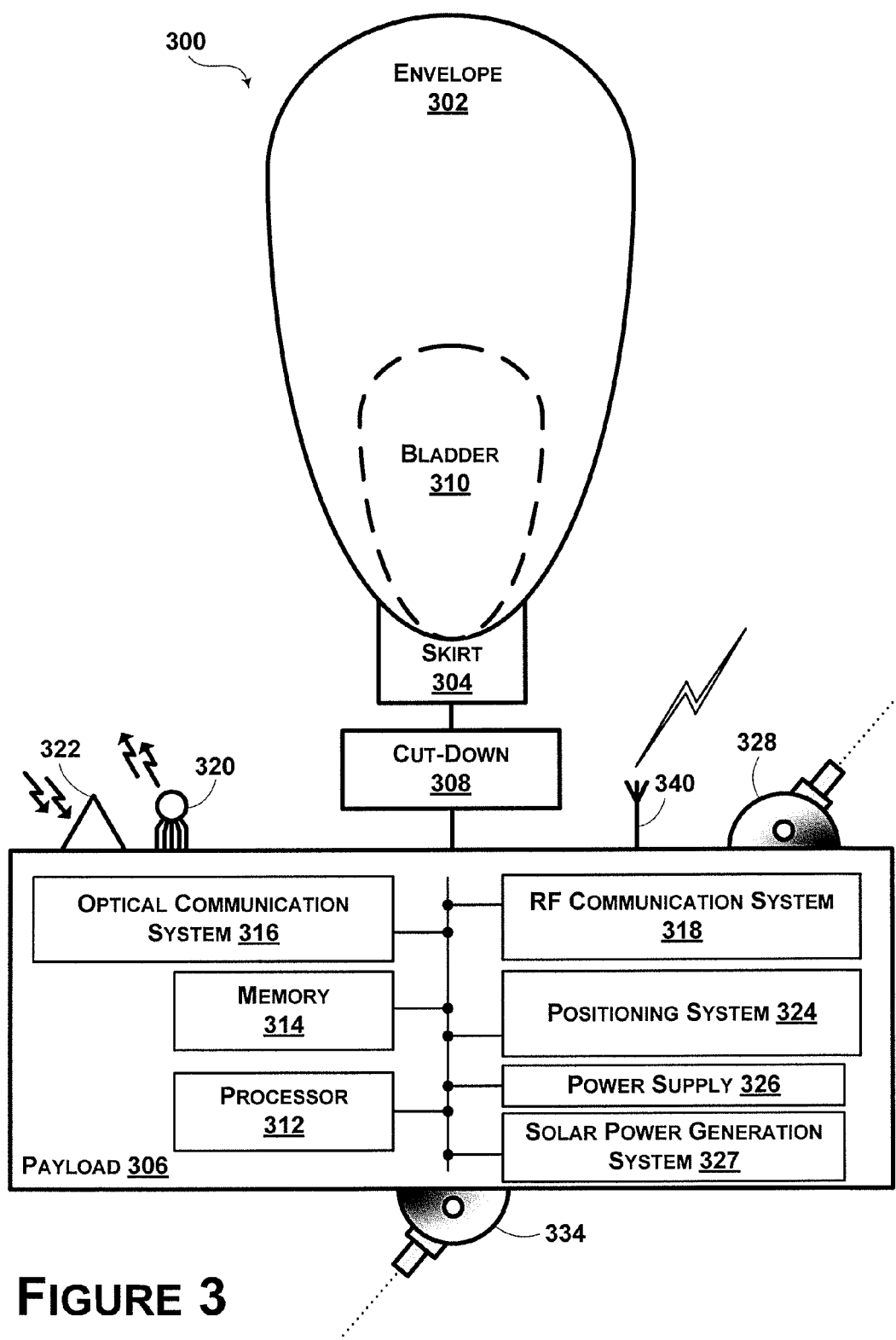
FIG. 3 shows a high-altitude balloon according to an example embodiment.

Various types of balloon systems may be incorporated in an exemplary balloon network. As noted above, an exemplary embodiment may utilize high-altitude balloons, which typically operate in an altitude range between 18 km and 25 km. FIG. 3 shows a high-altitude balloon 300, according to an exemplary embodiment. As shown, the balloon 300 includes an envelope 302, a skirt 304, a payload 306, and a cut-down system 308 that is attached between the balloon 302 and payload 304.

The envelope 302 and skirt 304 may take various forms, for instance, the envelope 302 and/or skirt 304 may be made of metalized Mylar or BoPet. Alternatively or additionally, some or all of the envelope 302 and/or skirt 304 may be constructed from a highly-flexible latex material or a rubber material such as chloroprene. Further, the shape and size of the envelope 302 and skirt 304 may vary depending upon the particular implementation. Additionally, the envelope 302 may be filled with various different types of gases, such as helium and/or hydrogen.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which can be accessed and executed by the processor 312 in order to carry out the balloon functions described herein.

The payload 306 of balloon 300 may also include various other types of equipment and systems to provide a number of different functions. For example, payload 306 may include optical communication system 316, which may transmit optical signals via an ultra-bright LED system 320, and which may receive optical signals via an optical-communication receiver 322 (e.g., a photo-diode receiver system). Further, payload 306 may include an RF communication system 318, which may transmit and/or receive RF communications via an antenna system 340. The payload 306 may further include a positioning system 324 that can include a GPS or other location-based sensors.

The payload 306 may also include a power supply 326 to supply power to the various components of balloon 300. The power supply 326 may include or take the form of a rechargeable battery. In addition, the balloon 300 may include a solar power generation system 327. The solar power generation system 327 may include solar panels and could be used to generate power that charges and/or is distributed by the power supply 326.

Further, payload 306 may include various types of other systems 328 and sensors 334. For example, payload 306 may include one or more video and/or still cameras, a GPS system, various motion sensors (e.g., accelerometers, gyroscopes, and/or compasses), and/or various sensors for capturing environmental data. Further, some or all of the components within payload 306 may be implemented in a radiosonde, which may be operable to measure, e.g., pressure, altitude, geographical position (latitude and longitude), temperature, relative humidity, and/or wind speed and/or direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in envelope 302.

In an exemplary embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter than air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, various contemplated embodiments, altitude control of balloon 300 could be achieved, at least in part, by adjusting the rotation of the balloon with respect to the sun.

Further, a balloon 300 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments the density of the balloon chamber in order to effectuate the determined altitudinal adjustments and cause the balloon to move laterally to the desired direction and/or to the desired location.

Alternatively, the altitudinal adjustments may be computed by a ground-based control system and communicated to the high-altitude balloon. As another alternative, the altitudinal adjustments may be computed by a ground-based or satellite-based control system and communicated to the high-altitude balloon. Furthermore, in some embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. This functionality may be utilized anytime the payload needs to be accessed on the ground, such as when it is time to remove balloon 300 from a balloon network, when maintenance is due on systems within payload 306, and/or when power supply 326 needs to be recharged or replaced.

In an exemplary embodiment, the cut-down system 308 may include a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302. Other types of cut-down systems and/or variations on the illustrated cut-down system 308 are possible as well.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it theoretically does not need to be accessed on the ground. In yet other embodiments, balloons may be serviced in-flight by specific service balloons or another type of service aerostat or service aircraft.

As described, movement and locations of balloons can vary since winds in the stratosphere may affect the locations of the balloons in a differential manner. A balloon in an example network may be configured to change its horizontal position by adjusting its vertical position (i.e., altitude). For example, by adjusting its altitude, a balloon may be able find winds that will carry the balloon horizontally (e.g., latitudinally and/or longitudinally) to a desired horizontal location. Wind speed varies with altitude, and since current wind speeds as well as weather forecasts are available, in principle, a balloon may be directed to a location by identifying an altitude at which a wind direction takes a balloon to along a desired trajectory. However, a balloon without other forms of propulsion may be constrained to follow the wind and there may not be a single altitude with winds taking the balloon along the desired trajectory. In addition, to control a fleet of balloons, movement of the balloons should occur from one location above the surface of the Earth to another in a predictable manner.

In one example, for a balloon trajectory from location A to location C, it is possible that there may be a wind at some altitude that could take a balloon from location A to location B, and wind at another altitude that could take the balloon from location B to location C. Thus, to traverse from location A to location C, an intermediate location B is needed. In other examples, to traverse from location A to location C may require passing from location A to location B1 to location B2 to location B3 and so on until arriving at location C. A number of possibilities grow with a number of "way-points" along a path. To control a fleet of balloons, a simultaneous plan of trajectory for many balloons at many starting locations is needed, and each balloon may take a different path. In addition, goals other than a location or trajectory may constrain how to control balloons including minimizing time or energy used, or maximizing time present over areas of interest, such as highly populated regions for example.

Within examples herein, a trajectory or flight plan for a balloon may be determined based on optimizing or minimizing a cost function. A path of a balloon can have a cost associated with the path based on a closeness of arriving at a desired final location. An example cost associated with arriving at or substantially close to the desired final location may be zero, while a penalty for every 100 miles away, for example, can result in an associated cost of X. The cost function might be a measure of whether or not a balloon arrived at a desired location, how closely the balloon reached that location, how long the balloon took to reach a location, how much fuel is required to reach a location, or many other factors all of which can be considered in any combination in various ways.

In other examples, in addition to or rather than determining cost values to steer a balloon such that the balloon arrives near a single location at a single point in time, a cost value can be specified for many locations and time intervals (or for every labeled location and every time interval) to establish a base cost for a flight plan for a balloon. A path cost can be established to indicate a cost matrix for an entire path going forward in time. A lookup-table can be generated that, given the time and a current location of a balloon, returns a control policy (e.g., in this example, desired altitudes) that will minimize a total path cost of the balloon's path over the course of the entire time period (e.g., T=0 to T=N), along with an expected cost of that path.

Figure 4:
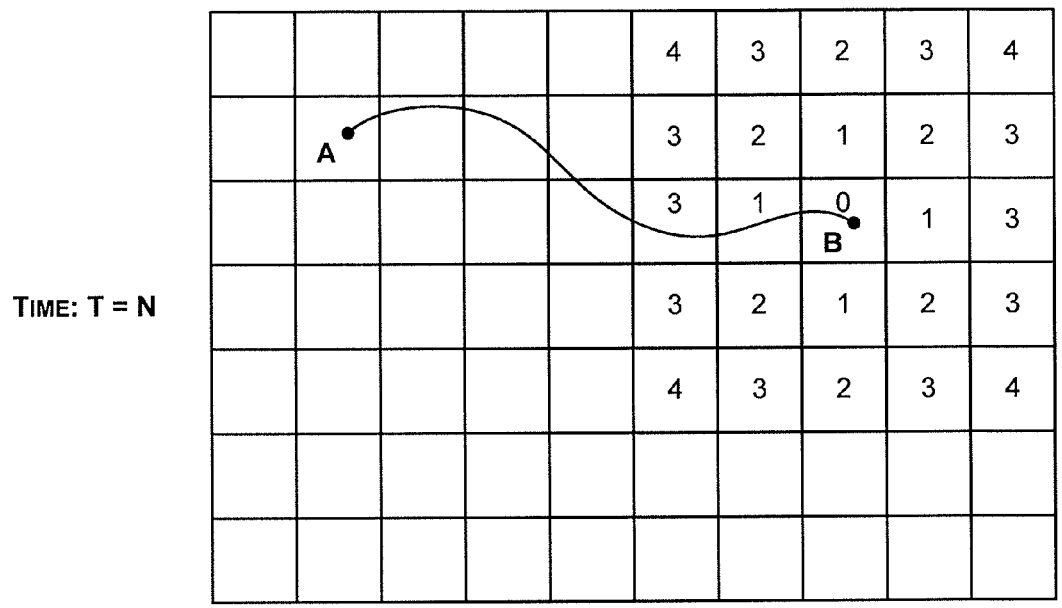
FIG. 4 illustrates an example cost value map where location A is a starting location of a balloon, location B is a desired final location, and example cost values are assigned to cells surrounding location B.

FIG. 4 illustrates an example cost value map where location A is a starting location of a balloon, location B is a desired final location, and example cost values are assigned to cells surrounding location B. For a discretized time period at times T=0, 1, 2, . . . , N (e.g., such as 5 minute intervals, 15 minute intervals, or any time period), an area can be discretized by dividing the area of interest (e.g., from a small region to possibly the entire Earth) into a finite number of cells. Time intervals may not be uniform, in some examples, such as using smaller intervals during the day when demand is higher and more solar charge is available for power. FIG. 4 illustrates a number of cells (e.g., a 10×7 grid of cells), and an optimal path from one cell to another for a single time step can be computed, such as for example, a straight line which may translate to a single choice of altitude for the entire time period for a balloon path. A cost score can be assigned to every cell for a given time along with an optimal altitude for a balloon starting from that cell, and thus, cost value maps may be generated for each time interval.

FIG. 4 illustrates an example cost value map for time T=N. It may be assumed that a balloon can traverse a certain amount of distance per time period. Each time period may be considered a planning phase, and thus, to traverse from location A to location B may require a number of planning phases.

At time T=N (e.g., a final time of a planning phase), there is no planning to do at this time interval for a balloon to arrive at a desired location since the balloon will be at a final location at this time, and a cost value can be assigned to each cell based on a final location of the balloon. For time T=N, cost values may be arbitrarily, randomly, or systematically assigned such that a cell in which the desired location resides has a low cost and cells further away may be assigned a higher cost value (e.g., the farther away from the desired location, the higher the cost value). Thus, as shown, a cell in which the desired location B resides can be assigned a cost value of zero, and cost values for surrounding cells can be assigned higher cost values based on a distance away from the desired location cell. Cost values for all cells can be populated in this manner by increasing the cost value for a given cell based on the distance from the desired location.

Following, cost value maps of all cells may be generated for each time T=0, 1, 2, . . . , N. To construct the cost value maps, initially a map may be generated for time T=N (as shown, for example, in FIG. 4), and maps for previous times may be generated working backwards, such as next generating a map for time T=N−1. Maps may be generated in order working backwards, such that after determining the map for time T=N, the map for time T=N−1 may be estimated, followed by the map for time T=N−2, and so on.

After generating the map at time T=N, to generate a map for a next previous time period, for a balloon present in every cell at time T=N−1, possible altitudes and corresponding possible locations that can be reached over the time interval from T=N−1 to T=N by following winds at the altitude can be estimated. In some example executions of the method, a single altitude may be chosen and possible locations estimated. However, in other examples, multiple altitudes may be used to generate additional estimations.

For the example where a plan is determined for a balloon to come as close as possible to a single location B at time T=N, the base cost matrix for T=N may appear as shown in FIG. 4 and the base cost matrix for T<N will be 0 everywhere (since it is not important where the balloon is before T=N).

Figure 5:
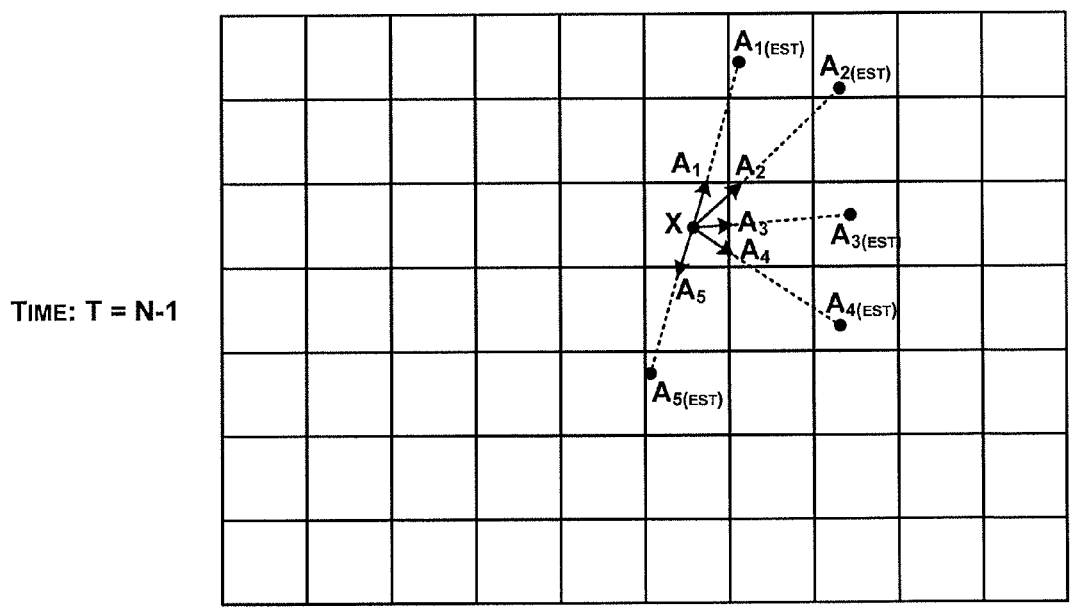
FIG. 5 illustrates estimated destination cells for a balloon starting at cell X, and moving with one of the five wind vectors $A_1$-$A_5$.

For each cell and for each altitude, an estimation of where the balloon will arrive by starting at that cell and flying at that altitude during the time interval can be determined, and a flight cost value can be assigned to the estimated flight. For example, weather predictions at time T=N−1 can be determined and different altitudes each may give different wind vectors. FIG. 5 illustrates an area divided into cells (e.g., a 10 by 7 grid of cells), and for a given cell labeled X, wind vectors $A_1$-$A_5$ are determined based on five different altitude levels.

In some examples, wind vectors associated with different altitudes may be the same for each cell. In other examples, wind vectors associated with different altitudes may vary based on the location of the cell. For each cell, an estimation of where a balloon would travel to (e.g., destination cell) at the end of the time period if the balloon started at the cell and moved with a given wind vector is determined. To do so, a direction and magnitude (e.g., speed) of the estimated wind vector can be used to estimate a trajectory and distance that the balloon travels, and to determine estimated destination cells (e.g., $A_{1(EST)}$-$A_{5(EST)}$). FIG. 5 illustrates estimated destination cells for a balloon starting at cell X, and moving with one of the five wind vectors $A_1$-$A_5$. The same determinations may be performed for each cell of the area. Example simulations can be performed to simulate movement of the balloons due to the estimated wind directions and speed, for example.

In some examples, further estimations may be made by a balloon traveling at a first altitude for a portion of a time interval and then changing to a second altitude for a remainder of the time interval. In some instances, there may not be a wind with a desired magnitude and direction that the balloon can travel along during an entirety of the time interval so as to travel to a desired destination. But, it could be possible that by traveling at any given number of combinations of altitudes, the winds may be able to carry the balloon to a desired location over the time interval. Thus, additional estimations using any number of altitudes per time interval and per cell can be generated, and a resulting wind vector per cell may be a combination of multiple wind vectors.

As shown in the example in FIG. 5, wind vector $A_3$ results in the balloon reaching a closest proximity to the desired final location B at time T=N. A flight cost value for the balloon traveling along wind vector $A_3$ may be assigned a value of zero, and flight cost values for a remainder of the wind vectors may be assigned higher cost values for causing the balloon to travel to a location further away from the desired destination (e.g., such as a $A_4$ having cost of one, $A_5$ having cost of four, $A_2$ having cost of two, and $A_1$ having cost of three). A table illustrating and storing all flight costs per cell and per altitude can be generated for each time interval, such as Table 1 shown below for time T=N−1.

TABLE 1

| Time T = N − 1/Flight Cost Values | | | | |
|---|---|---|---|---|
| Cell | Altitude ($A_1$) | Altitude ($A_2$) | Altitude ($A_3$) | ... |
| X | 3 | 2 | 0 | |
| . | | | | |
| . | | | | |
| . | | | | |

To compute the path cost matrix, a path cost for T=N may be set equal to the base cost matrix, as you shown in Table 1. Then, for each location, all possible path segments that can be taken from T=N−1 to T=N can be determined. There will typically be one path per sample altitude, however, in some examples, if altitude changes are allowed within time intervals, there may be more. A base cost of each possible path segment can be determined, and this may be represented by an integral with respect to time of the base cost underneath the balloon, interpolating the underlying discrete base costs in both time and 2D location. Additional elements may be incorporated into the integral, such as for example, to penalize altitudes that require higher power to transmit to customers. If the time interval and cell size are small (size may vary due to application), the base cost of the starting location can be used as the base cost for each potential path.

The base cost for each possible path segment can be added to the path cost of the segment's destination (again, possibly with interpolation depending on cell size). This sum is the path cost of the segment. Table 2 below shows the sum of the path cost of the destination plus the base cost. As I mentioned above, for the example where a plan is determined for a balloon to come as close as possible to a single location B at time T=N, the base cost matrix for T<N will be 0 everywhere (since it is not important where the balloon is before T=N), and thus, the values for different altitudes in Table 2 are the base cost for T<N added to the costs shown in Table 1.

The values shown in Tables 1 and 2 may be stored to provide an accumulated cost value for balloons per cell traveling along a given altitude.

TABLE 2

| Time T = N − 1/Accumulated Cost Values | | | | |
|---|---|---|---|---|
| Cell | Altitude ($A_1$) | Altitude ($A_2$) | Altitude ($A_3$) | ... |
| X | 0 + 3 = 3 | 0 + 2 = 2 | 0 + 0 = 0 | |
| . | | | | |
| . | | | | |
| . | | | | |

As a final step, a path cost for each cell at T=N−1 may be set to be the minimum path cost across all potential path segments originating from the cell, and the control policy (e.g., including altitude) that produces that path segment can be stored and associated with that cell. Iterations can be performed to determine the path cost and control policy for each cell at prior times, all the way back to T=0, for example.

In some examples, a noise model can be applied when determining possible path segments. In that case, the path costs for each control policy (desired altitude) may be the average path cost of all possible path segments that might result from taking that action, weighed by the probability of an occurrence.

An altitude that results in a smallest accumulated cost value can be determined, and the altitude and cost value can be stored for the destination cell for time T=N−1. Thus, in the example described, for cell X at time T=N−1, a balloon in cell X that has a desired destination location B at time T=N can be instructed to travel at altitude $A_3$. A cost value map for time T=N−1 can be generated using values of Table 2 for each cell by selecting an altitude that gives a lowest cost value per cell. For cell X, for example, a cost value of zero may be assigned and associated with altitude vector $A_3$.

Within some examples, a cost of a flight step may be zero (e.g., T<N as described above). However, in other examples, a non-zero cost can be assigned to each step of the flight in which case Table 1 might have values modified to be as shown below in Table 3 based on other factors.

TABLE 3

| Time T = N − 1/Flight Cost Values | | | | |
|---|---|---|---|---|
| Cell | Altitude ($A_1$) | Altitude ($A_2$) | Altitude ($A_3$) | ... |
| X | 3.5 | 4 | 5 | |
| . | | | | |
| . | | | | |
| . | | | | |

This example may encourage balloons to fly lower, assuming $A_1$ is a lower altitude, and may be selected to provide better wireless service to ground customers, for example. Using this example, Table 2 above may have values modified to be as shown below in Table 4.

TABLE 4

| Time T = N − 1/Accumulated Cost Values | | | |
|---|---|---|---|
| Cell | Altitude ($A_1$) | Altitude ($A_2$) | Altitude ($A_3$) ... |
| X | 3.5 + 3 = 6.5 | 4 + 2 = 6 | 5 + 0 = 5 |

A new number that becomes stored or associated with cell X will be the smallest of {3+3.5, 2+4, 0+5, ... } which in this example is 5 for altitude $A_3$. Although balloons may be encouraged to fly low by Table 3, in this example, the lowest path is not selected for this step because even though it looks best for this one step, the higher flight paths cause the balloons to ultimately have a lower cost when fully accumulated to the end.

Within examples, the process above may be repeated to determine map(s) of cost values for time intervals T=N−2 and so on until T=0. In some examples, each cell of a given map has estimates of directions that are based on estimates of directions as determined for a future time interval. This provides a feedback loop to plan at a first time interval for the balloon to take a given path so that the balloon will be at a location needed during the next time interval to take appropriate action, and so on.

A combination of the maps over the time period T=0 to T=N may be used to determine how to control many balloons. The maps may be considered estimated trajectory plans for balloons starting in every possible cell for the entire period of time from T=0 to T=N. In some examples, the maps represent a growth of possible choices of altitudes for a balloon to be positioned at over time, and such altitude choices may include moving the balloon up, down, or remaining at a current altitude.

In some examples, given a target time and location (and an initial time), a measure of how close to the target location a balloon could get, if it were flying from initial time to target time, can be determined using the cost value maps. For each point (or location/cell) in the starting location grid, an altitude at which a balloon should fly at the initial time to travel as close as possible to the target location by target time can be determined. The maps for all time intervals may be considered or referenced to determine a sequence of flight policies for balloons spanning the flight period. As the flight progresses, an updated policy can be determined by accessing a map associated with an appropriate time interval of the flight.

Within examples, cost values and cost data may be determined by performing look-ups in a table, such as Table 1 and Table 2 above. The tables may provide cost values for each integer degree of various latitudes and longitudes. In other examples, for locations in which a given latitude falls between two latitudes listed in the table, any method of interpolation (e.g., linear or cubic) may be used to determine a cost value for such a location value.

Within examples, using the tables above and cost value maps shown in FIGS. 4-5, a trajectory of a given balloon can be determined. For two or more balloons, it may be desirable for the balloons to follow different trajectories rather than the same trajectory so as to avoid redundancy. As one alternative example, cost functions may be based on population density in an area, and high cost values can be assigned to areas where population density is low so as to encourage balloons to travel to high population areas (or to low cost areas). Balloon trajectories may be determine for a first balloon for a full time period, and following, the population density map can be modified to subtract an amount of population that can be considered to be served (e.g., in a simulation) by the first balloon. As the balloon is in different locations at different times, a different population map can be generated for each time step. After modifying the population density map to assign new cost values based on the altered remaining population not yet served, balloon trajectories for a second balloon can be determined. Because the already served population has been removed from the map, the cost values for those areas will now be higher and less attractive for balloons to travel to since another balloon already traveled to that location at a particular time step. When determining balloon trajectories for the second balloon, a new trajectory is determined that attempts to serve a population not yet previously served by the first balloon. Following, the population density map can be modified to subtract an amount of population that can be considered served by the second balloon, and new cost values can be assigned based on the altered remaining population density map. These functions may be iteratively repeated, such that for example, to control a fleet of one hundred balloons, the population density map and associated cost values can be modified for each balloon (e.g., one hundred times) to take into account operation of the balloon in an area. This may enable a distribution of a fleet of balloons to be spread out over populated areas.

The population density map described above may be considered to represent the base cost matrix (described with reference to Tables 1-4), with a number of balloons necessary to satisfy a particular cell at a given time expressed as a negative cost (or alternatively as a base reward). As balloon paths are determined, the population that is served can be removed from the matrix. Once a cell has all the balloons that are needed for a given time, the base cost (or reward) can be set to zero, regardless of how many additional balloons may cross that location.

In other examples, after generating a path cost matrix for each balloon, a solution for the balloon path may be optimized by selecting a given balloon B, adding back the population served by the balloon B (i.e., setting the population to what the population would be if balloon B had not flown), re-calculate an optimal path for balloon B, and repeat these steps for a new balloon until a desired global fitness is achieved, which may be determined based on a rate at which the global fitness increases with each iteration going below a threshold or a maximum runtime has been reached.

In yet further examples, rather than run balloons through the algorithm one at a time, groups can be selected in parallel. For each iteration of a loop, a percentage of balloons can be selected, and a base cost matrix can be calculated based on an initial demand density minus any demand already served by balloons that have already had paths assigned and that were not in the selected set. The path cost and control policy matrix may be calculated based on the base cost matrix. All balloons in the selected set can be simulated using the same calculated control policy, and the resulting path is associated (at least for now) with that balloon. Iterations may be performed with a new set of balloons. As the algorithm continues, a percentage of balloons selected for re-planning may be decreased. (The exact schedule for the decrease might, for example, be based on simulated annealing or similar heuristics). A solution may be determined based on a convergence to an acceptable solution.

In some examples, when performing the fleet plan for an (N+1) balloon, balloon trajectories have already been determined for the entire time period for a previous N balloons. Thus, planning for the (N+1) balloon may consider the previous N balloons trajectories including both where the previous N balloons are located and where the previous N balloons will be instructed to go.

In some examples, using the maps, a plan may be generated to control a fleet of balloons according to a given constraint. As an example, if it is desirable to have the fleet of balloons over location B four days from today, the time period may be determined to be four days (e.g., 96 hours), and a set of maps can be generated to plan altitude choices at which to instruct the balloons to fly to arrive at location B.

Figure 6:
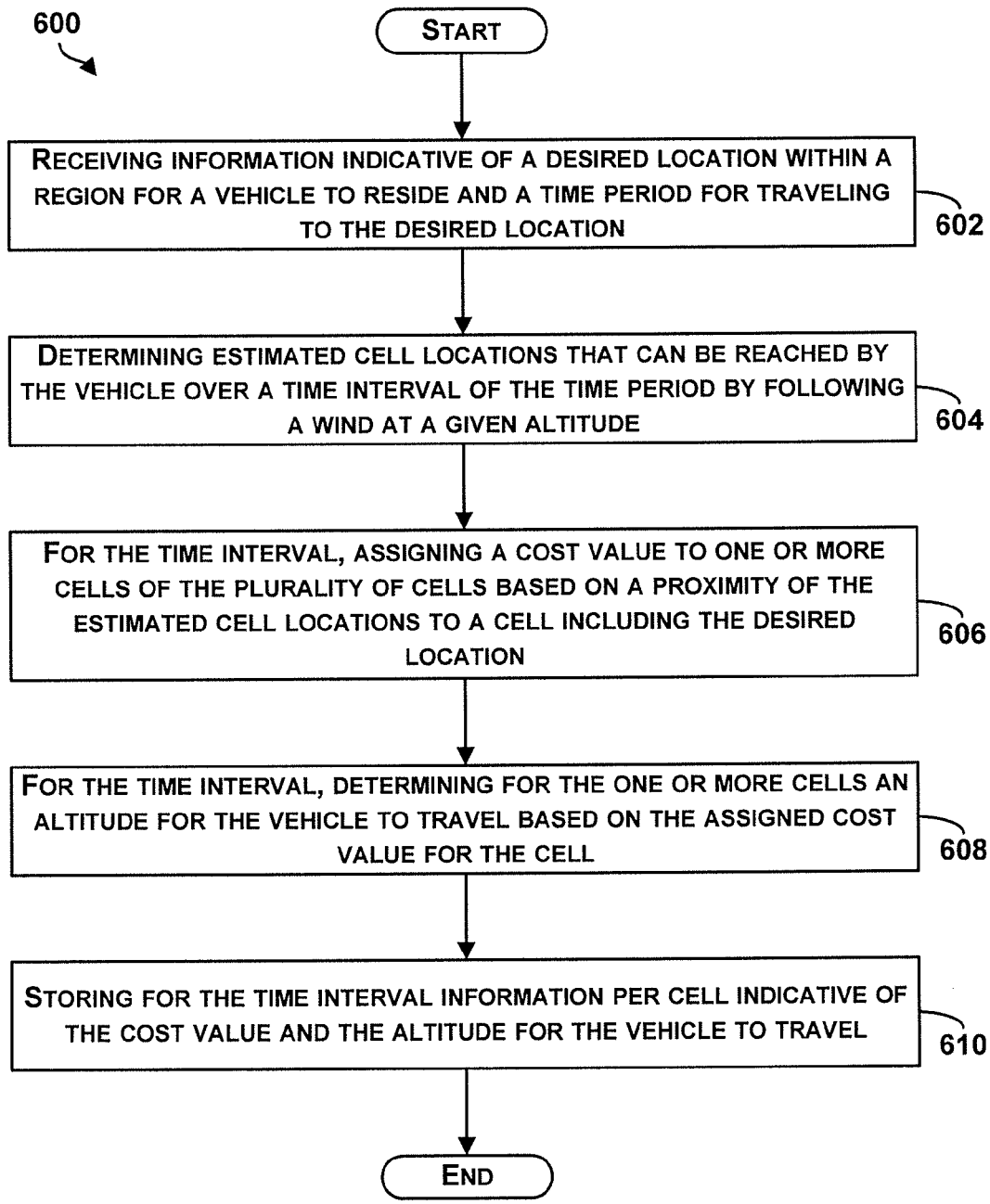
FIG. 6 is an example block diagram of a method to determine an altitude for a balloon to travel, in accordance with at least some embodiments described herein.

FIG. 6 is an example block diagram of a method to determine an altitude for a balloon to travel, in accordance with at least some embodiments described herein. Method 600 shown in FIG. 6 presents an embodiment of a method that, for example, could be used with the balloon networks 100 and 204, for example, and may be performed by a device, a server, a control station, a balloon, or a combination of any components of the balloon networks 100 and 204. Method 600 may include one or more operations, functions, or actions as illustrated by one or more of blocks 602-610. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 600 and other processes and methods disclosed herein, each block in FIG. 6 may represent circuitry that is wired to perform the specific logical functions in the process.

At block 602, the method 600 includes receiving information indicating a desired location within a region for a vehicle to reside and a time period for traveling to the desired location. The region can be divided into a plurality of cells. The desired location may reside within a given cell of the region. The information indicating the desired location for a balloon to reside and a time period for traveling to the desired location may be a coverage requirement, and may indicate a number of balloons needed to provide a specific amount of data communication coverage for the desired location. The desired location may be or include a specific latitude/longitude coordinate, a general area (such as a sporting event arena), or a city. In some examples, the region may be considered the entire Earth, and a granularity of the desired location may be or include any number of different resolution levels as can be provided based on a number of available balloons.

At block 604, the method 600 includes determining estimated cell locations that can be reached by the vehicle over a time interval of the time period by following a wind at a given altitude. In one example, information about an estimated wind direction and speed at a number of altitudes for each cell may be received, and a distance and direction that the balloon would travel based on the estimated wind direction and speed at the altitude can be calculated. Due to the distance and direction traveled, a cell associated with a destination of the balloon can be identified as one of the cells of the region where the balloon would reside by traveling the estimated distance and direction. In some examples, estimated wind direction and speed for a given altitude and given location may be determined by accessing weather databases, or may be based on information received from balloons that may include sensors for estimating and providing weather information.

At block 606, the method 600 includes, for the time interval, assigning a cost value to one or more cells (or in some examples, to each cell) of the plurality of cells based on a proximity of the estimated cell locations to a cell including the desired location. In one example, cost values may be assigned as described above with reference to FIGS. 4-5. Cost values may be assigned such that the cost value assigned to cells increases as the proximity of the cells to the cell including the desired location decreases.

In some examples, a map of cost values can be generated for each time interval. A map for a final time interval can be generated first, by arbitrarily or programmatically assigning cost values to cells based on distance of the cell to the cell including the desired location. Subsequently, maps for each remaining time interval can be generated in reverse sequential order, such that a map for a first time interval is generated last. Maps for each time interval (except the last time interval) may have cost values based on cost values of subsequent time intervals (e.g., future time intervals of the time period). Thus, a map for a respective time interval may have a first cost value assigned to cells based on the proximity of the cell to a cell including the desired location, and cost values of the cell for a subsequent time interval can be determined and combined with the first cost value so as to provide the resulting cost value of the cell for the time interval. In this manner, planning is performed in a backward manner to predict where a balloon should travel during a time interval so as to be at a location in the future to enable the balloon to travel as needed.

In further examples, a cost value may be assigned based on an amount of time for the balloon to reach the desired location from the balloons current or an initial location. Thus, if the amount of time is more than that available during the time interval, the cost value may be high. The higher the time to travel to the desired location, a higher cost value may be assigned.

The cost value may be a numeric value using any range of values, or may be a qualitative value such as "high", "medium", and "low" or any number of different qualifiers.

At block 608, the method 600 includes, for the time interval, determining for the one or more cells an altitude for the vehicle to travel based on the assigned cost value for the cell. In some examples, an altitude may be determined in the manner described with respect to FIGS. 4-5. An altitude resulting in a lowest cost value may be selected.

In some examples, a plurality of altitudes at which the balloon can travel may be determined, and distances and directions that the balloon would travel based on estimated wind directions and speeds at each of the plurality of altitudes can be determined. Cost values can be determined for cells where the balloon would travel to, and an altitude resulting in a lowest cost value can be selected.

At block 610, the method 600 includes storing for the time interval information per cell indicative of the cost value and the altitude for the vehicle to travel. The method 600 may be performed for all time intervals of the time period to store for each time interval resulting altitudes per cell at which the balloon can travel in an optimized manner to reach a desired destination.

In some examples, the method 600 may further include providing an instruction to the balloon to travel at the determined altitude associated with the time interval and while the balloon is within a portion of the region designated the cell associated with the altitude. Thus, a set of instructions can be provided that indicates a travel plan for the balloon. The travel plan may indicate specific altitudes to fly at for each specific cell of the region. In other examples, an instruction can be sent to the balloon to indicate to change an altitude, and the instruction may be sent when the altitude change is needed.

The balloon may be one of many balloons within a fleet of balloons, and the method 600 may be performed to determine for each time interval and for each cell a respective altitude for each balloon of the fleet of balloons to travel. A fleet plan can be determined using the altitudes for each balloon that will be associated with a time and location at which the balloon will be instructed to fly at the altitude.

Although examples described with reference to FIG. 6 refer to balloons as the vehicles, the method 600 may be performed based on other types of vehicles as well, such as other aerial vehicles, mobile objects, and including elements that may have propulsion mechanisms as well.

In some examples, the method 600 or portions of the method 600 may be performed by a ground-based station (e.g., the ground-based station 112 in FIG. 1) or a central system (e.g., the central control system 200 in FIG. 2), and instructions can be provided to individual balloons. In other examples, the method 600 or portions of the method 600 may be perform by the balloons themselves, or by processors or computing devices residing on the balloon, for example. The balloons may receive any necessary information for performing the method 600 from a server or ground-base station or from other balloons. In further examples, the method 600 may be performed by a combination of the balloons and by ground-based stations, and each may be in communication so as to perform functions of the method 600.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
    receiving, by at least one processor communicatively linked to a vehicle, information indicative of a desired location within a region for the vehicle to reside, the region being divided into a plurality of cells;
    determining, by the at least one processor, estimated cell locations that are able to be reached by the vehicle by following a wind at a given altitude;
    assigning, by the at least one processor, a cost value to a given cell of the plurality of cells based on a proximity of the estimated cell locations to a cell that includes the desired location;
    determining, by a navigation system communicatively linked to the at least one processor, an altitude for the vehicle to travel based on the assigned cost value for the given cell; and
    controlling, by a buoyancy system communicatively linked to the at least one processor, the vehicle to travel at the determined altitude.

2. The method of claim 1,
    wherein the information is further indicative of a desired time period for traveling to the desired location,
    wherein determining estimated cell locations that are able to be reached by the vehicle by following a wind at a given altitude comprises: determining estimated cell locations that are able to be reached by the vehicle over a time interval of the time period by following a wind at a given altitude, and
    wherein assigning a cost value to a given cell of the plurality of cells based on a proximity of the estimated cell locations to a cell that includes the desired location comprises: for the time interval, assigning a cost value to a given cell of the plurality of cells based on a proximity of the estimated cell locations to a cell that includes the desired location.

3. The method of claim 2, wherein determining an altitude for the vehicle to travel based on the assigned cost value for the given cell comprises:
    for the time interval, determining an altitude for the vehicle to travel based on the assigned cost value for the given cell.

4. The method of claim 2, further comprising:
    for the time interval, assigning a cost value to a given cell of the plurality of cells based on a given cost value assigned to the given cell for a subsequent time interval.

5. The method of claim 2, further comprising storing for the time interval information per cell indicative of the cost value and the altitude for the vehicle to travel.

6. The method of claim 2, wherein the time period is divided into a plurality of time intervals and the time interval is one of the plurality of time intervals, wherein the method further comprises:
generating a map for a last time interval of the plurality of time intervals; and
subsequently generating a map for each remaining time interval of the plurality of time intervals in reverse sequential order.

7. The method of claim 6, wherein a given map for a given time interval includes cost values based on cost values of a given map for a given subsequent time interval.

8. The method of claim 2,
determining, for each altitude of a plurality of altitudes, estimated cell locations that can be reached by the vehicle over the time interval of the time period by following a given wind at the given altitude;
for each altitude, assigning the cost value to the given cell of the plurality of cells based on the proximity of the estimated cell locations to the cell including the desired location and based on the given cost value of the cell for the subsequent time interval;
for the one or more cells, determining an altitude of the plurality of altitudes based on the cost value of the given cell; and
storing for the time interval and for the given cell in non-transitory data storage coupled to or in communication with the computing device information indicative of the determined altitude of the plurality of altitudes.

9. The method of claim 2, wherein the time period is divided into a plurality of time intervals and the time interval is one of the plurality of time intervals, wherein the method further comprises:
determining for each time interval of the plurality of time intervals information per cell indicative of a given cost value and an associated altitude for the vehicle to travel.

10. The method of claim 2, wherein assigning the cost value to the given cell of the plurality of cells comprises:
assigning a first cost value based on the proximity of the estimated cell locations to a cell including the desired location;
determining a given cost value of the given cell for the subsequent time interval; and
combining the first cost value and the given cost value of the given cell for the subsequent time interval so as to provide the cost value of the given cell for the time interval.

11. The method of claim 2, wherein the time period is divided into a plurality of time intervals and the time interval is one of the plurality of time intervals, wherein the method further comprises:
determining for each time interval of the plurality of time intervals a map including information per cell indicative of a given cost value and an associated altitude for the vehicle to travel;
receiving information indicative of a fleet of vehicles and associated cells for each vehicle representative of a location of each vehicle; and
determining for each time interval of the plurality of time intervals a respective altitude for each vehicle of the fleet of vehicles to travel based on the map for each time interval.

12. The method of claim 1, wherein the vehicle includes a balloon within a data network and is operable to provide data communication via optical or radio-frequency (RF) links.

13. The method of claim 1, wherein a given cost value of cells increases as the proximity of the cells to the cell including the desired location decreases.

14. The method of claim 1, wherein controlling the vehicle to travel at the determined altitude comprises controlling the vehicle to travel at the determined altitude while the vehicle is within a portion of the region designated as the given cell associated with the determined altitude.

15. The method of claim 1, wherein a given cost value is based also on an amount of time for the vehicle to reach the desired location.

16. The method of claim 1, further comprising:
determining, for each altitude of a plurality of altitudes, estimated cell locations that can be reached by the vehicle by following a given wind at the given altitude;
for each altitude, assigning the cost value to the one or more cells of the plurality of cells based on the proximity of the estimated cell locations to the cell including the desired location;
for the one or more cells, determining an altitude of the plurality of altitudes based on the cost value of the cell; and
storing for the time interval and for the one or more cells information indicative of the determined altitude of the plurality of altitudes.

17. The method of claim 1, wherein determining estimated cell locations that are able to be reached by the vehicle by following the wind at the given altitude comprises:
receiving information indicative of an estimated wind direction and speed at the given altitude;
estimating a distance and direction that the vehicle would travel based on the estimated wind direction and speed at the given altitude; and
determining a given cell of the plurality of cells where the vehicle would reside by traveling the estimated distance and direction.

18. The method of claim 17, further comprising:
receiving information indicative of estimated wind directions and speeds at a plurality of altitudes;
estimating distances and directions that the vehicle would travel based on the estimated wind directions and speeds at each of the plurality of altitudes;
determining cells of the plurality of cells where the vehicle would reside by traveling the estimated distances and directions;
assigning cost values to one or more of the cells of the plurality of cells based on a proximity of the cells to the desired location; and
selecting a respective altitude of the plurality of altitudes which results in the vehicle traveling to a respective cell based on a cost value of the respective cell.

19. The method of claim 1, further comprising determining a path for the vehicle to travel to the desired location based on selections of respective altitudes for the vehicle to travel within cells of the plurality of cells.

20. The method of claim 1, wherein determining the estimated cell locations that are able to be reached by the vehicle by following the wind at the given altitude comprises:
receiving, from a given vehicle residing at the given altitude, information indicative of an estimated wind direction and speed at the given altitude; and estimating a distance and direction that the vehicle would travel based on the estimated wind direction and speed at the given altitude.

21. The method of claim 1, wherein one or more of the at least one processor, the navigation system, and the buoyancy system are included as part of the vehicle.

22. The method of claim 1, wherein one or more of the at least one processor, the navigation system, and the buoyancy system are at a location remote from the vehicle.

23. A system, comprising:
a navigation system;
a buoyancy system;
at least one processor; and
data storage comprising program instructions executable by the at least one processor to cause the at least one processor to perform functions comprising:
receiving, by the at least one processor, information indicative of a desired location within a region for a vehicle to reside, the region being divided into a plurality of cells;
determining, by the at least one processor, estimated cell locations that are able to be reached by the vehicle by following a wind at a given altitude;
assigning, by the at least one processor, a cost value to a given cell of the plurality of cells based on a proximity of the estimated cell locations to a cell that includes the desired location;
determining, by the navigation system, an altitude for the vehicle to travel based on the assigned cost value for the given cell; and
controlling, by the buoyancy system, the vehicle to travel at the determined altitude.

24. The system of claim 23,
wherein the information is further indicative of a desired time period for traveling to the desired location,
wherein determining estimated cell locations that are able to be reached by the vehicle by following a wind at a given altitude comprises: determining estimated cell locations that are able to be reached by the vehicle over a time interval of the time period by following a wind at a given altitude, and
wherein assigning a cost value to a given cell of the plurality of cells based on a proximity of the estimated cell locations to a cell that includes the desired location comprises: for the time interval, assigning a cost value to a given cell of the plurality of cells based on a proximity of the estimated cell locations to a cell that includes the desired location.

25. The system of claim 24, wherein determining an altitude for the vehicle to travel based on the assigned cost value for the given cell comprises: for the time interval, determining an altitude for the vehicle to travel based on the assigned cost value for the given cell.

26. The system of claim 24, wherein the functions further comprise:
for the time interval, assigning a cost value to a given cell of the plurality of cells based on a given cost value assigned to the given cell for a subsequent time interval.

27. The system of claim 24, wherein the time period is divided into a plurality of time intervals and the time interval is one of the plurality of time intervals, wherein the functions further comprise:
determining for each time interval of the plurality of time intervals a map including information per cell indicative of a given cost value and an associated altitude for the vehicle to travel;
receiving information indicative of a fleet of vehicles and associated cells for each vehicle representative of a location of each vehicle;
determining for each time interval of the plurality of time intervals a respective altitude for each vehicle of the fleet of vehicles to travel based on the map for each time interval; and
providing a respective instruction to each vehicle of the fleet of vehicles to travel at the respective altitude for the given time interval and while the vehicle is within a portion of the region designated as a given cell associated with the respective altitude.

\* \* \* \* \*